Patented July 6, 1954

2,683,162

UNITED STATES PATENT OFFICE 2,683,162

SYNTHETIC DRYING OIL MODIFIED BY AFTER-TREATMENT WITH POLAR COMPOUNDS

Anthony H. Gleason, Westfield, N. J., assignor to Standard Oil Development Company, a corporation of Delaware No Drawing. Application July 23, 1949,
Serial No. 106,487

12 Claims. (Cl. 260—465)

This invention relates to enamels which use an oily polymer of butadiene as vehicle and more particularly to an improvement obtained by treatment of the polymeric vehicle with a small amount of various reactive polar compounds.

Synthetic drying oils can be prepared by various methods from butadiene alone or from mixtures containing butadiene together with materials copolymerizable therewith. Sodium polymerization, emulsion polymerization as well as bulk polymerization in the presence of a diluent and a peroxide type catalyst have been used for this purpose with varying degrees of success. However, among the difficulties encountered with various synthetic drying oils were poor drying rate, poor flexibility, poor adhesion of air-dried coatings, poor wetting properties and consequent difficulty of grinding in pigments, poor gloss and streakiness of brushed enamel films. And while some of these disadvantages have been overcome in the past, this usually resulted in aggravation of other undesirable characteristics. In general the sodium catalyzed polymers have been found to be most economical to produce and to have a good drying rate, but at the same time this type of drying oil was found to have particularly poor pigment wetting power and enamels prepared therefrom gave dull and very streaky films, especially when applied by brushing. It has now been discovered that these disadvantages of sodium polymerized synthetic drying oils can be overcome by treating the drying oil with various polar modifying agents. In general, the suitable modifying agents belong to two principal categories: firstly, the category of monoethylenically unsaturated non-hydrocarbon compounds whose ethylenic linkage is capable of reacting with the methylene groups adjacent to the double bonds of the oily polymer; and secondly, the category of polar compounds containing a thiol group capable of reacting with the double bond of the oily polymer. Although the reactive mechanism by which the two types of compounds combine with the polymer is chemically different, the eventual effectiveness of both these types of compounds as modifiers is similar and depends on their ability to impart polar characteristics to the oily hydrocarbon polymer.

Suitable ethylenic modifiers, include acrylonitrile, α-methacrylonitrile, α-chloracrylonitrile, methyl acrylate, butyl acrylate, methyl methacrylate, vinyl acetate, vinyl methyl ketone, cinnamaldehyde and so on.

Suitable thiol modifiers include thioglycolic acid, mercaptopropionic acid $SH.(CH_2)_2COOH$, thiosalicylic acid $SH.C_6H_4.COOH$ and the corresponding esters, aldehydes and ketones. The methyl or ethyl esters such as ethyl thioglycolate are particularly well suited.

For the purposes of this invention it is particularly advantageous to use drying oils which have been obtained by polymerizing 60 to 100 parts of butadiene-1,3 with 40 to 0 parts of styrene, preferably about 75 to 85 parts of the former and 25 to 15 parts of the latter, the polymerization being carried out at 20 to 100° C., preferably between 65 and 85° C., in a reaction diluent. As a polymerization catalyst about 0.1 to 10 parts, preferably about 1 to 3 parts of a finely dispersed metallic sodium catalyst is used in the optional presence of various polymerization modifiers which tend to promote the reaction and produce colorless products of more exactly reproducible drying rates. As reaction diluent it is desirable to use, for example, a naphtha having a boiling range between about 90 and 120° C. or straight run mineral spirits such as Varsol (boiling range 150 to 200° C.), inert hydrocarbon diluents boiling between —15° C. and 200° C. such as butane, xylene, benzene, toluene, cyclohexane or the like, individually or in admixture with each other. The diluents are usually used in amounts ranging from 50 to 500, preferably 150 to 300 parts per 100 parts of monomers.

Instead of using inert diluents, it is also possible to use modifying diluents such as butene-2 or other low boiling olefins which modify the reaction by limited copolymerization and chain termination. Various ethers having more than two carbon atoms per molecule such as diethyl ether, diisopropyl ether, dioxane, vinyl ethyl ether, vinyl isobutyl ether, anisole and phenetole are also useful as diluents and are particularly helpful as co-diluents to insure formation of colorless products when used in amounts ranging from about 10 to 35 parts per 100 parts of monomers, together with the aforesaid amount of inert diluent such as solvent naphtha; p-dioxane is particularly preferred. Other means of modifying the properties of the polymer product involve the substitution of all or at least part of the butadiene feed with other diolefins such as isoprene, piperylene, 2,3 - dimethyl butadiene - 1,3 or 2-methyl pentadiene-1,3. Also instead of styrene, various ring-substituted alkyl styrenes such as p-methyl styrene or p-ethyl styrene, or the dimethyl styrenes may be used.

Especially where a coarse dispersion of sodium is used as catalyst, it is also advantageous to use about 1 to 50 weight percent, preferably 10 to 20% based on sodium of a $C_1$ to $C_5$ aliphatic alcohol. Secondary and tertiary alcohols, particularly isopropanol or tertiary butanols are preferred. Such alcohols act as polymerization promoters and, depending on the degree of catalyst dispersion, have a more or less pronounced effect on the intrinsic viscosity of the resulting product. The reaction time and induction period also vary depending on the degree of catalyst dispersion and reaction temperature, the reaction time ranging from about 40 hours with a coarse catalyst at about 50° C. to about 15 minutes at about 90° C. with a catalyst particle size of less than 100 microns diameter. While sodium is preferred, similar catalysts such as potassium, sodium hydride, various alloys of sodium or the "Alfin" type catalysts comprising a complex of a metallated olefin and sodium alcoholate are also useful, but not nearly as effective. Agitation of the reaction mixture during synthesis increases the efficiency of the catalyst. Conversions of 50 to 100% on monomers can be accomplished fairly readily in batch-type as well as in continuous polymerizations, although the catalyst requirements are twice or three times greater for continuous operation than for a batch operation of equal conversion.

Destruction of catalyst at the end of the reaction is effectively accomplished by adding to the reactor a moderate excess of alcohol, e. g. 100% excess of isopropanol based on sodium, and agitating at the reaction temperature for another half hour or so. After destruction of the residual sodium by alcohol the crude product containing the alcoholate, excess alcohol and other solid impurities is cooled, neutralized with dry carbon dioxide, glacial acetic acid or other preferably anhydrous acid which does not affect the polymer and the neutralized product is then filtered with a filter aid such as silica gel, clay, charcoal, glass fibers or its equivalent.

In the preferred modification the clear colorless filtrate is then fractionally distilled to remove first the alcohol-hydrocarbon azeotropes and then the dioxane-hydrocarbon azeotropes. Finally, if the polymerization is carried out in a relatively large amount of hydrocarbon diluent so that the resulting polymer solution is too dilute for use as a varnish or enamel base, it is desirable to distill off additional hydrocarbon until a product containing about 50% non-volatile matter is obtained, the non-volatile matter being the polymeric drying oil. The resulting product, being a solution of polymer drying oil in a suitable hydrocarbon solvent such as solvent naphtha or mineral spirits is a clear, colorless varnish composition having a viscosity between about 0.5 and 5 poises at 50% non-volatile matter. The molecular weight of the non-volatile or polymeric constituents of the product preferably falls between about 2,000 to 5,000, corresponding to an intrinsic viscosity of about 0.15 to 0.3. If desired, the product viscosity can be readily increased within or above these limits by heat bodying at temperatures between 200 and 300° C., e. g. at 220 to 260° C. Such clear varnish compositions can be brushed, poured or sprayed and give good clear films on drying in air or baking, especially when conventional driers such as the naphthenates or octoates of cobalt, lead or manganese are added thereto.

However, while drying oil compositions of the type described above give a good clear varnish, they are poor wetting vehicles for pigments and give enamels that produce films which lack gloss, are streaky when brushed and wherein the pigments tend to agglomerate. Moreover, a particularly disturbing fact has been that, under seemingly identical conditions, products were obtained whose gloss and wetting power were entirely dissimilar, ranging from extremely poor to fair. Wetting agents such as aromatic sulfonates or diamines such as octadecyl diethenyl diamine, or linoleic acid, as well as polar and non-polar solvents such as acetone or various alcohols were found to be ineffective in overcoming satisfactorily the aforesaid disadvantages when added to the drying oil compositions.

It has now been discovered that these disadvantages, chracteristic of the aforementioned drying oils, can be eliminated and that drying oils of excellent pigment wetting power resulting in enamels of uniformly excellent gloss can be obtained when the oils are made to contain about 0.01 to 1.5%, preferably with 0.05 to 0.5% of acrylonitrile or other polar modifying agents named earlier herein. This beneficial treatment with acrylonitrile may be carried out by adding a sufficient amount of the modifying agent, e. g., 0.5 to 10% based on the polymer, to the finished polymer and heating the mixture at 50° to 250° C., temperatures between 180° and 220° C. being preferred especially where the modifying treatment is carried out without any catalyst. A peroxide catalyst in amounts ranging from about 0.1 to 2% based on the polymer may also be used to advantage in order to accelerate the reaction between the drying oil and the ethylenically unsaturated modifying agent. Suitable peroxide catalysts include benzoyl peroxide, tertiary butyl hydroperoxide, peracetic acid, cumene hydroperoxide, etc. Tertiary butyl peroxide is preferred since it eventually leaves a volatile residue which can be removed from the product more readily than similar residues of the other catalysts.

The alternative thiol modifiers such as thioglycolic acid add to the polymer fairly readily and quantitatively, and no peroxide catalyst is usually employed in such an event since the slight gain in reaction rate is often offset by an undesirable impairment of clarity due to formation of insoluble disulfide compounds by oxidation of the thiol compounds.

The practical reaction times for such aftertreatment vary between about 15 minutes and 2 hours depending on the presence or absence of catalyst as well as on the temperature employed. However, in the case of ethylenically unsaturated modifiers such as acrylonitrile it has been observed that even under the most favorable conditions, all of the modifying agent does not combine with the polymer. In such an event, the unreacted excess modifier may be separated from the oil and recycled, or it may be left in the product without substantially impairing the latter.

The subsequent Examples 1–11 are presented to illustrate the advantages of oils treated in accordance with the present invention as opposed to untreated oils (Runs A–D). All quantities expressed herein as "parts" refer to parts by weight.

*Run A.*—A butadiene-styrene drying oil was prepared from the following charge:

| | Parts |
|---|---|
| Butadiene-1,3 | 80 |
| Styrene | 20 |
| Varsol* | 200 |
| Dioxane | 40 |
| Isopropanol | 0.2 |
| Sodium** | 1.5 |

\* Straight run mineral spirits; API gravity, 49.0; flash, 105° F.; boiling range 150° to 200° C.; solvent power, 33–37 Kauri-Butanol value (reference scale: Benzene—100 K. B. value, n-heptane 25.4 K. B. value).
\*\* Dispersed to a particle size of 10 to 50 microns by means of an Eppenbach Homo-Mixer.

The polymerization of this charge was carried out at 50° C. in a 2-liter autoclave provided with a mechanical agitator. Complete conversion was obtained in 4.5 hours. The catalyst was destroyed and removed from the resulting crude product and the product was finished to contain 50% non-volatile matter as described in earlier parts of this specification. The resulting product had a viscosity of 0.9 poise and the non-volatile portion thereof had an average molecular weight of about 3,000.

*Run B.*—When Run A was duplicated using the same charge and identical conditions as far as possible, a finished product was obtained having a viscosity of 1.2 poises at 50% non-volatile matter.

*Runs C–D.*—In still other duplicate runs, finished products were obtained having viscosities as shown in the table.

All of the drying oil products described above gave excellent, protective coatings when applied as a clear varnish to steel, wood and other conventional surfaces. Films containing customary small amounts of driers, such as 0.05% cobalt, 0.05% manganese and 0.5% lead in the form of naphthenates, applied by pouring or brushing the clear varnish, had good drying rates in that they were generally set to touch in 2 to 4 hours and became tack free in 10 to 24 hours. The resulting dry films were hard, smooth, glossy, unaffected by water, grease or caustic and only slightly discolored by soap.

However, when these same oils were used for the preparation of enamels by incorporating therein pigments such as titanium oxide, the results were unsatisfactory both because an unduly large amount of oil was required on the pigment grinding mill to form a smooth, homogeneous paste and because of the uncontrollable lack of gloss and pour leveling of films formed from the resulting enamels as described below.

The drying oils involved were evaluated on a water-cooled laboratory pigment mill comprising three consecutive rolls revolving at differential speeds, the first roll being the slowest and the third roll being the fastest. In accordance with conventional practice, the oil and pigment paste is placed between the first and second revolving roll, and carried off. It will be understood that the lowest possible ratio of oil to pigment, also known as "paste factor," is desired in industry in order to allow the most rapid mill throughput possible. Once the paste is formed, it is thereafter readily thinned out to the required consistency by simply mixing it with additional amounts of oil. The formula used in this enamel evaluation was:

100 g. $TiO_2$\*
200 g. Synthetic drying oil, 50% N. V. M. in Varsol
0.05% Co\*\*
0.05% Mn\*\*
0.5% Pb\*\*

\* Ti—Pure R610.
\*\* Driers in the form of naphthenates.

The enamels were applied to steel panels both by pouring and by brushing, and the gloss of the resulting dried enamel films as well as presence or absence of brush marks were observed. These data as well as the paste factor of each drying oil tested are shown in the table, whence it can be seen that the synthetic drying oils prepared as described above are poor vehicles for enamels, giving an unduly high paste factor and dried films of poor or erratic gloss and poor leveling.

The improvement obtained in accordance with the present invention is apparent from the following examples.

EXAMPLE 1

100 parts of the oily product containing 50% non-volatile matter in straight run mineral spirits and obtained as previously described in Run A (oil viscosity 0.9 poise) was mixed with 2 parts of acrylonitrile and 0.35 part of t-butyl hydroperoxide catalyst and the resulting mixture was refluxed for 6 hours at 70° C. The treated oil had a viscosity of 1.0 poise.

When this product was used for the preparation of enamels in accordance with the procedure and formula given earlier herein, a favorably low paste factor and films of excellent gloss and leveling characteristics were obtained as shown in the table. The drying rate of the enamel was good. It should be noted in particular that the paste factor of the modified oil has been reduced by about one half as compared with the paste factor of the original unmodified oil (Run A).

EXAMPLE 2

In this run the ingredients and reaction conditions were the same as in Example 1 above, except that the amount of acrylonitrile added was increased to four parts.

From the table it can be seen again that due to the increased nitrile content the resulting modified polymer was characterized by a paste factor which was appreciably better even than the paste factor obtained in Example 1, but in most other respects the two modified oils were approximately equivalent. The viscosity of the treated oil was 1.2 poise.

EXAMPLE 3

100 parts of the oil described in the preceding examples were mixed with 4 parts of acrylonitrile and 0.35 part of t-butyl hydroperoxide catalyst and the mixture refluxed for 22 hours at 90° C. The results in the table show that the paste factor of the resulting modified oil is still further improved as compared with the results of Example 2, apparently because the more severe reaction conditions bring about a more extensive reaction between the oil and acrylonitrile. Considerable bodying occurred during this treatment as indicated by a final product viscosity of 5.5 poises.

EXAMPLE 4

This time 100 parts of the oil described above were mixed with 2 parts of acrylonitrile and heated in a closed reactor for 3 hours at 200° C. in the absence of any catalyst. The resulting modified oil had a still better paste factor than the oils produced in any of the preceding examples, indicating that the acrylonitrile reacts extensively with the hydrocarbon oil even in the absence of any catalyst provided that the reaction time or temperature or both are increased appropriately. At the same time it may be observed, however, that in contrast to the previous examples where the modifying treatment had been carried out in the presence of a peroxide catalyst, in this example the drying rate of the resulting oil has not been accelerated.

EXAMPLES 5–11

Still other reaction conditions and other modifying agents were used to improve the synthetic drying oil of Run A as shown in the table whence it can be seen that a small amount of a wide variety of ethylenically unsaturated and mercapto compounds having a strong polar group such as a nitrile group, a carboxyl group, an ester group, an aldehyde group and the like can be effectively reacted with a synthetic butadienoid drying oil so as to improve its paste factor, enamel gloss and other properties. And although with the exception of the thioglycolic acid derivatives a substantial amount of added modifier remains in the oil uncombined at the end of the reaction, it has been proven by tests not reported here that the unexpectedly effective improvement in paste factor and the like is not due to the unreacted portion of modifier present in the oil, but only to the combined portion, even if the latter equals only a small fraction of modifier initially added.

The results are summarized in the table which follows.

enamel B have defied explanation and could not be obtained again in other runs despite repeated and painstaking efforts exactly to duplicate all conditions which prevailed in the synthesis of the oil used in Run B. This illustrates the impossibility of obtaining a product of consistent quality by careful control of the unmodified drying oil synthesis.

In contrast to the unsatisfactory and erratic results of Runs A to D, tabulated Examples 1 to 15 show that the hydrocarbon oils treated in accordance with the present invention possess excellent pigment wetting power and give dried enamel films of good or excellent gloss and leveling characteristics when a suitable modifier is incorporated in the oily polymer in an after-treating step.

Coating compositions can be prepared from the oils of the invention to meet varying specifications. In particular, they accept readily all types of toner colors as well as organic and inorganic pigments such as titanium oxide, chrome green, carbon black, red lead, toluidine and lithol reds, iron and phthalocyanine blues, chrome yellows and hansa yellows. Depending on type of pigment employed and eventual use contemplated, the concentration of pigment may be varied in various enamels within broad ranges such as between 5 and 75 percent based on the weight of non-volatile polymeric constituents of the drying oil base. For example, carbon black is usually used in concentrations ranging from 6 to 10%, titanium dioxide 40 to 60% and lead pigments in even higher concentrations. The compositions can be extended or mixed with suitable hydrocarbon solvents boiling between about 80 and 200° C. which solvents may be of the type used as a reaction diluent in the oil synthesis aforesaid or with other solvents such as Table
ENAMEL EVALUATION

| Enamel (Run No.) | Treated Oil Viscosity (Poise) | Added Modifier | Paste Factor, g. Oil/100 g. Pigment | Gloss Poured Film | Gloss Brushed Film | Leveling (Absence of Brush Marks) | Drying Rate (Hours) | |
|---|---|---|---|---|---|---|---|---|
| | | | | | | | Set-to-Touch | Tack-Free |
| Prior Art: | | | | | | | | |
| A | 0.9 | None | 121.5 | Flat | Egg Shell | Poor | 4–6 | <24 |
| B | 1.2 | do | 122.5 | Excellent | Excellent | Excellent | 4–6 | <24 |
| C | 0.5 | do | 142.0 | Flat, Seedy | Fair | Poor | 4–6 | >24 <48 |
| D | 0.8 | do | 154.7 | Flat | do | do | 4–6 | <24 |
| Invention: | | | | | | | | |
| Example 1 | 1.0 | Acrylonitrile, 2% (A) | 62.3 | Excellent | Excellent | Excellent | 2–4 | 6 |
| Example 2 | 1.2 | Acrylonitrile, 4% (A) | 52.2 | do | do | do | 2–4 | 6 |
| Example 3 | 5.5 | Acrylonitrile, 4% (C) | 47.2 | do | do | do | 2–4 | 6 |
| Example 4 | 1.3 | Acrylonitrile, 2% (B) | 38.1 | do | do | do | 6 | 20–24 |
| Example 5 | 1.2 | Acrylonitrile, 0.25% (B) | 57. | do | do | do | 6–8 | 24 |
| Example 6 | 1.1 | Acrylonitrile, 0.75% (B) | 53.8 | do | do | do | 6–8 | 24 |
| Example 7 | 1.3 | Cinnamaldehyde, 2% (B) | 64. | do | do | do | 6 | 24 |
| Example 8 | 1.2 | Methyl Acrylate, 5% (A) | 66.1 | do | do | do | 2–4 | 6 |
| Example 9 | 1.3 | Butyl Acrylate, 2% (B) | 53.4 | do | do | do | 6 | 24 |
| Example 10 | 1.2 | Vinyl Acetate, 2% (B) | 68. | do | do | do | 6 | 20–24 |
| Example 11 | 1.0 | SH.CH$_2$.COOH, 0.5% (D) | 35. | Good | Good | Good | 8 | 20–24 |
| Example 12 | 1.0 | SH.CH$_2$.COOH, 0.25% (D) | 50. | do | do | do | 6–8 | <24 |
| Example 13 | 1.0 | SH.CH$_2$.COOH, 0.1% (D) | 53.8 | do | do | do | 6–8 | <24 |
| Example 14 | 1.0 | SH.CH$_2$.COO Et., 0.5% (D) | 44. | do | do | do | 8 | 20–24 |
| Example 15 | 1.5 | SH.CH$_2$.COO Et., 2% (B) | 49.0 | Excellent | | Excellent | 2 | 8 |

(A) Reacted for 6 Hrs. at 70° C., t-butyl hydroperoxide catalyst, 0.7% on polymer.
(B) Reacted for 3 Hrs. at 200° C., (No catalyst).
(C) Reacted for 22 Hrs. at 90° C., t-butyl hydroperoxide catalyst, 0.7% on polymer.
(D) Reacted for 0.5 Hrs. at 160° C., (No catalyst).

Runs A–D listed in the table show that all the untreated synthetic drying oils had paste factors of about 120 and higher, whereas in industry values between 20 and 80, preferably between 20 and 50, are usually specified. Furthermore, with the exception of enamel B, the untreated enamels gave dried films characterized by unsatisfactory gloss and poor leveling. The excellent gloss characteristics of the dried films from xylene, various naphthas, mixed aromatics in the benzene and xylene range, white oils, solvents known as "Solvesso" and so on.

Furthermore, while the treated oily products of the invention by themselves yield protective coatings having well balanced properties, they can be modified further by mixing therewith other drying oils such as linseed oil, tung oil, soybean oil or other unsaturated vegetable oils.

When desired, the products of the invention can also be mixed with various resins such as rosin and ester gum to obtain protective coatings having special characteristics.

Having described and illustrated the invention by means of several detailed examples, it will be understood that various other embodiments or modifications not specifically illustrated herein are possible without departing from the spirit of the invention or from the scope of the appended claims.

I claim:

1. A process for improving a polymeric drying oil prepared by copolymerization of 75 to 85 parts of butadiene-1,3 and 25 to 15 parts of styrene in the presence of metallic sodium which comprises mixing said oil with 0.5 to 10% of a reagent selected from the group consisting of acrylic nitriles, alkyl acrylates, vinyl acetate, vinyl ketones, cinnamaldehyde, thioglycolic acid, alkylthioglycolates, and thiosalicyclic acid, and heating the mixture at a temperature between 50° and 250° C.

2. A process according to claim 1 in which the reagent is an acrylic nitrile.

3. A process according to claim 2 in which the acrylic nitrile is acrylonitrile.

4. A process according to claim 1 wherein the reagent is a compound having the formula $SH.CH_2.COOR$ where R stands for a member selected from the group consisting of hydrogen, methyl and ethyl.

5. A process according to claim 1 in which the reagent is thioglycolic acid.

6. A drying oil consisting essentially of a sodium copolymer of 75 to 85 parts of a $C_4$ to $C_6$ conjugated diolefin, 25 to 10 parts of styrene and 0.01 to 1.5 parts of a compound selected from the group consisting of acrylic nitriles, alkyl acrylates, vinyl acetate, vinyl ketones, cinnamaldehyde, thioglycolic acid, alkylthioglycolates, and thiosalicyclic acid, said copolymer having an intrinsic viscosity between about 0.15 and 0.30.

7. A drying oil according to claim 6 in which the compound is an acrylic nitrile.

8. A drying oil according to claim 7 in which the acrylic nitrile is acrylonitrile.

9. A drying oil according to claim 6 in which the compound is thioglycolic acid.

10. An enamel base comprising an oily sodium copolymer of 75 to 85 parts of butadiene-1,3, 25 to 15 parts of styrene and 0.01 to 1.5 parts of a compound selected from the group consisting of acrylic nitriles, alkyl acrylates, vinyl acetate, vinyl ketones, cinnamaldehyde, thioglycolic acid, alkylthioglycolates, and thiosalicyclic acid, and heating the mixture at a temperature between 50° and 250° C.

11. An enamel base according to claim 9 in which the agent is acrylonitrile.

12. An enamel base according to claim 9 in which the agent is thiolglycolic acid.

References Cited in the file of this patent

UNITED STATES PATENTS

| Number | Name | Date |
|---|---|---|
| 2,252,333 | Rothrock | Aug. 12, 1941 |
| 2,385,182 | Anderson et al. | Sept. 18, 1945 |
| 2,396,957 | Razier et al. | Mar. 19, 1946 |
| 2,398,321 | Mowry | Apr. 9, 1946 |
| 2,419,202 | D'Alelio | Apr. 22, 1947 |
| 2,425,086 | D'Alelio | Aug. 5, 1947 |
| 2,435,790 | Long | Feb. 10, 1948 |
| 2,459,126 | Clifford | Jan. 11, 1949 |
| 2,469,132 | Schulze et al. | May 3, 1949 |
| 2,512,697 | Grotenhuis | June 27, 1950 |
| 2,527,768 | Schulze et al. | Oct. 31, 1950 |
| 2,564,795 | Sibley | Aug. 21, 1951 |
| 2,569,383 | Reyonmark et al. | Sept. 25, 1951 |
| 2,581,094 | Gleason et al. | Jan. 1, 1952 |
| 2,586,594 | Arundale et al. | Feb. 19, 1952 |

FOREIGN PATENTS

| Number | Country | Date |
|---|---|---|
| 542,645 | Great Britain | Jan. 21, 1942 |

OTHER REFERENCES

"Sodium-Catalyzed Copolymerization of 1,3-Butadiene and Styrene," C. S. Marvel et al., Journal of Polymer Science, vol. 1, 1946, pages 275–288.